(12) United States Patent
Zarkovsky et al.

(10) Patent No.: US 11,588,549 B1
(45) Date of Patent: Feb. 21, 2023

(54) SYSTEMS, DEVICES, AND METHODS FOR POLARIZATION RECOVERY

(71) Applicant: MELLANOX TECHNOLOGIES, LTD., Yokneam (IL)

(72) Inventors: Segev Zarkovsky, Tel Aviv (IL); Shai Cohen, Haifa (IL); Liron Gantz, Haifa (IL); Idan Yokev, Raanana (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/397,681

(22) Filed: Aug. 9, 2021

(51) Int. Cl.
*H04B 10/2507* (2013.01)
*H04B 10/03* (2013.01)
*H04B 10/67* (2013.01)
*H04J 14/06* (2006.01)

(52) U.S. Cl.
CPC ......... *H04B 10/03* (2013.01); *H04B 10/2507* (2013.01); *H04B 10/67* (2013.01); *H04J 14/06* (2013.01)

(58) Field of Classification Search
None
See application file for complete search history.

(56) References Cited

U.S. PATENT DOCUMENTS

| | | | | |
|---|---|---|---|---|
| 6,538,787 B1 * | 3/2003 | Moeller | ............. | H04B 10/2569 385/11 |
| 6,804,434 B1 * | 10/2004 | Chandrasekhar | ...... | G02B 6/266 385/27 |
| 7,272,327 B2 * | 9/2007 | Epworth | ............ | H04B 10/2513 398/208 |
| 7,289,739 B2 * | 10/2007 | Bulow | ............... | H04B 10/2569 398/147 |
| 7,542,686 B2 * | 6/2009 | Madsen | ............. | H04B 10/2569 398/208 |
| 7,873,282 B2 * | 1/2011 | Secondini | .......... | H04B 10/2569 398/213 |
| 8,401,400 B2 * | 3/2013 | Cai | .................... | H04B 10/2507 398/208 |
| 9,615,152 B2 * | 4/2017 | Jeong | ................. | H04Q 11/0005 |
| 9,819,420 B2 * | 11/2017 | Wen | ..................... | H04B 10/532 |
| 10,126,572 B2 * | 11/2018 | Zhang | .................. | G02F 1/0136 |
| 10,148,364 B2 * | 12/2018 | Lyubomirsky | ....... | H04B 10/614 |
| 10,386,582 B2 * | 8/2019 | Mansouri Rad | ..... | G02B 6/2813 |
| 2012/0002971 A1 * | 1/2012 | Doerr | ....................... | G02B 6/30 398/115 |
| 2021/0405295 A1 * | 12/2021 | Bhargava | ............. | G02B 6/4213 |

OTHER PUBLICATIONS

Wen et al., 200G self-homodyne detection with 64QAM by endless optical polarization demultiplexing, Jul. 2020, Optics Express (Year: 2020).*

(Continued)

*Primary Examiner* — Jai M Lee
(74) *Attorney, Agent, or Firm* — Sheridan Ross P.C.

(57) ABSTRACT

A polarization recovery device comprises an input that receives a first optical signal with unknown polarization and with at least one signal parameter at an initial value, a first output that outputs a second optical signal with known polarization and with the at least one signal parameter at or near the initial value, and a recovery block that generates the second optical signal based on the first optical signal.

20 Claims, 8 Drawing Sheets

(56) References Cited

OTHER PUBLICATIONS

Ashok et al. "Endless optical phase delay based phase synchronization in low-power coherent DCIs," 2020 IEEE Photonics Conference (IPC), Sep. 28-Oct. 1, 2020, 2 pages.
Kahn et al. "Drivers and Design Options for Coherent Links in Data Centers," IEEE Optical Interconnects Conference, Oct. 1, 2020, 27 pages.
Noe et al. "Endless Polarization Control Systems for Coherent Optics," Journal of Lightwave Technology, Jul. 1988, vol. 6, No. 7, pp. 1199-1208.
Wen et al. "200G self-homodyne detection with 64QAM by endless optical polarization demultiplexing," Optics Express, Jul. 2002, vol. 28, No. 15, pp. 21940-21955.

* cited by examiner

SYSTEMS, DEVICES, AND METHODS FOR POLARIZATION RECOVERY

FIELD OF THE DISCLOSURE

The present disclosure is generally directed to systems, devices, and methods for polarization recovery.

BACKGROUND

Optical fiber networks offer fast and generally reliable data transmission between devices. In these networks, optical transceivers and waveguides are often employed to send and/or receive light signals modulated with data. A signal sent from a transmitter to a receiver over a waveguide (e.g., an optical fiber) may be influenced by properties of the waveguide. For example, the waveguide may introduce variations in polarization of the signal as the signal traverses the waveguide from the transmitter to a receiver.

BRIEF SUMMARY

In an illustrative embodiment, a polarization recovery device comprises an input that receives a first optical signal with unknown polarization and with at least one signal parameter at an initial value, a first output that outputs a second optical signal with known polarization and with the at least one signal parameter at or near the initial value, and a recovery block that generates the second optical signal based on the first optical signal.

In another illustrative embodiment, a receiver comprises a polarization recovery device including an input that receives a first optical signal with unknown polarization and with at least one signal parameter at an initial value, a first output that outputs a second optical signal with known polarization and with the at least one signal parameter at or near the initial value, and a recovery block that generates the second optical signal based on the first optical signal.

In another illustrative embodiment, a method comprises determining to perform a reset operation for a first phase shifter of a polarization recovery device based on one or more factors associated with the first phase shifter, generating at least one control signal to be applied to at least one additional phase shifter of the polarization recovery device during the reset operation to keep at least one parameter of a signal output from the recovery device within acceptable limits, and outputting the at least one control signal to the at least one additional phase shifter.

Additional features and advantages are described herein and will be apparent from the following Description and the figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts relate to polarization recovery devices that enable the relative phase and amplitudes of two optical waves to change continuously in a glitch-free manner using, for example, thermal heater phase shifters. In general, the analytical free space problem is mapped to a silicon photonics device. A polarization recovery device according to inventive concepts includes an auxiliary degree of freedom and is proven to allow glitch-free operation while maintaining a relatively small component footprint and reducing cost.

Figure 1:
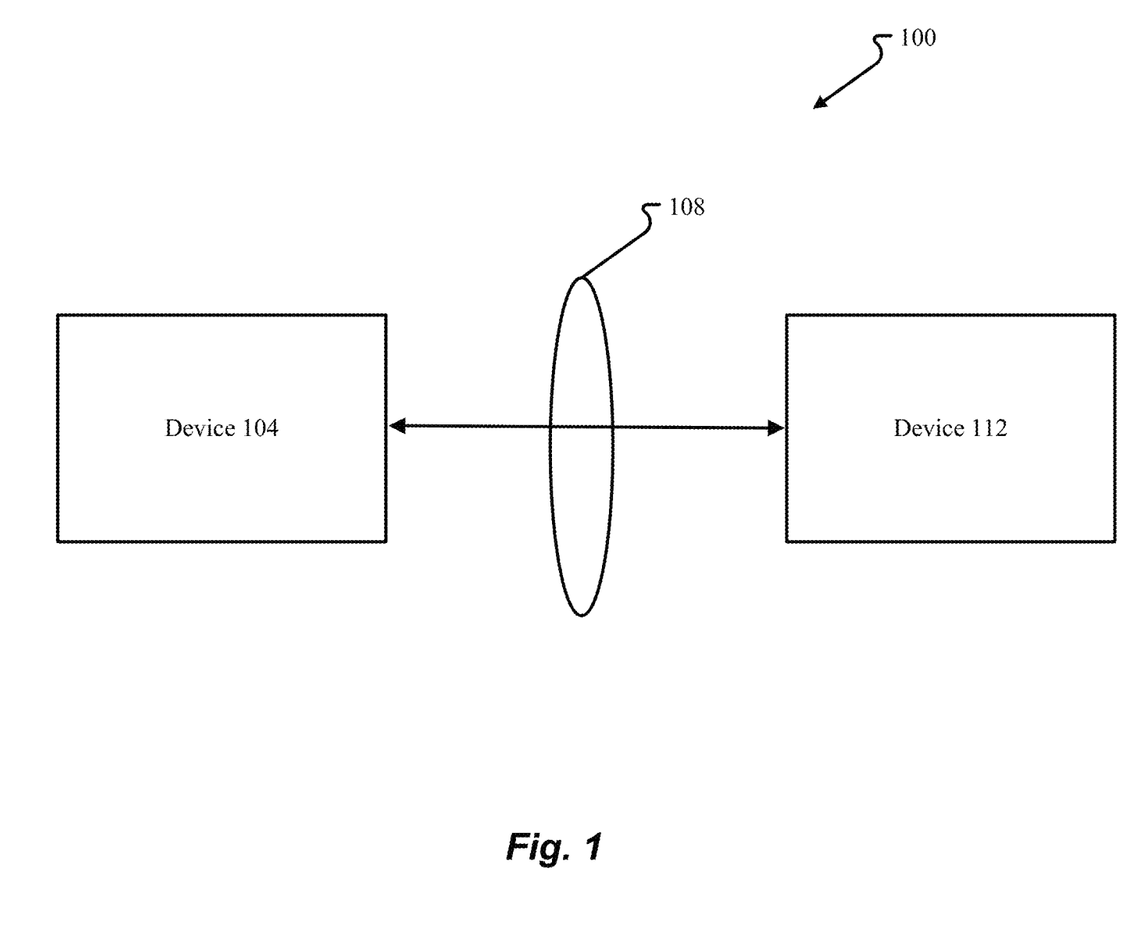
FIG. 1 illustrates a system according to at least one example embodiment.

FIG. 1 illustrates a system 100 according to at least one example embodiment. The system 100 may be part of a datacenter and may include a network device 104, a communication network 108, and a network device 112. In at least one example embodiment, network devices 104 and 112 may correspond a network switch (e.g., an Ethernet switch), a network interface controller (NIC), or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using optical signals.

Although not explicitly shown, the network device 104 and/or the network device 112 may include storage devices and/or processing circuitry for carrying out computing tasks, for example, tasks associated with controlling the flow of data within each network device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the network devices 104 and 112 include one or more communication interfaces for facilitating wired and/or wireless communication between one another and other unillustrated elements of the system 100.

As discussed in more detail below, each network device 104 and 112 may include one or more transmitters that transmit optical signals over the communication network 108 and one or more receivers that receive optical signals over the communication network 108.

Although not explicitly shown, it should be appreciated that devices 104 and 112 may include other processing devices, storage devices, and/or communication interfaces generally associated with computing tasks, such as sending and receiving data.

Figure 2:
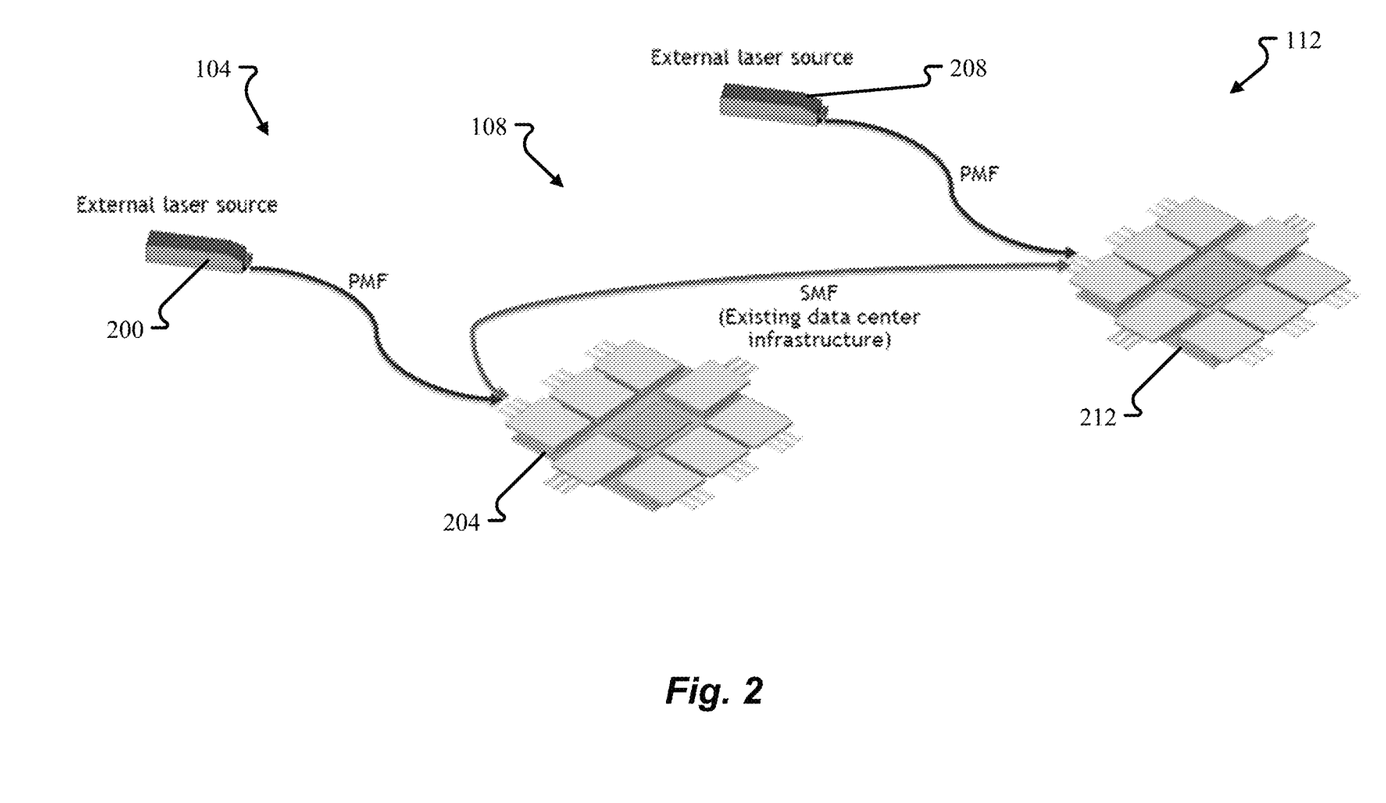
FIG. 2 illustrates various additional details for components in the system of FIG. 1 according to at least one example embodiment.

FIG. 2 illustrates various additional details for components in the system of FIG. 1 according to at least one example embodiment.

In FIG. 2, network device 104 may comprise a laser source 200 and a multichip module (MCM) 204 while network device 112 may comprise a laser source 208 and an MCM 212.

Each laser source 200 and 208 may include one or more lasers or other suitable light source(s) that emit light at one or more wavelengths. Each laser or light source may be capable of emitting modulated light (e.g., a vertical-cavity surface emitting laser (VCSEL)) or each laser source 200 and 208 may further comprise one or more modulators to modulate light emitted from each laser.

Each MCM 204 and 212 may include one or more core digital ASICs (e.g., electrical switches) surrounded by peripheral chips called satellite chips or chiplets. In the example of FIG. 2, MCMs 204 and 212 each have eight chiplets arranged around a central switching ASIC. Each chiplet may include components that enable conversion of optical signals to electrical signals for routing by the switching ASIC to other chiplets and conversion of electrical signals to optical signals for sending over the communication network 108. For example, each chiplet may include a transceiver (with transmitter driving circuitry and lens components and with receiver amplification circuitry and lens components), clock and data recovery circuitry, digital signal processing circuitry, serializer/deserializer (Serdes) circuitry, encryption and decryption circuitry, and/or an input/output interface (e.g., parallel I/O) that interfaces with the ASIC. Alternatively, one or more of the above listed items may be included on the ASIC.

As shown in FIG. 2, the optical links between each laser source 200 and 208 and a respective MCM 204 and 212 may comprise one or more polarization-maintaining fibers (PMFs) that maintain an optical signal's state of polarization (SOP) over the link. A PMF may have any suitable structure such as a PANDA configuration, an elliptical-clad configuration, and/or a bow-tie configuration. Here, it should be appreciated that the laser source 200 may be co-located with the MCM 204 in one datacenter while the laser source 208 and MCM 212 may be co-located in a remote datacenter. However, example embodiments are not limited to using PMFs as the link between each laser source 200 and 208 and a respective MCM 204 and 212, and SMFs may alternatively be employed as the link. In this case, the same or similar polarization recovery methods and devices described herein may be used at each MCM 204 and 212.

The optical link between MCMs 208 and 212 (e.g., an optical link of the communication network 108 between datacenters) may comprise one or more single-mode fibers (SMFs). In general, PMFs are more costly than SMFs, making it cost prohibitive to link MCMs 204 and 212 with PMFs, particularly over long distances (e.g., over 100 m).

However, an SMF may introduce random birefringence to optical signals so that an optical signal received at an MCM has unknown polarization (e.g., random polarization). At least one example embodiment of the instant application relates to recovering and/or tracking polarization of received optical signals with unknown polarization while enabling substantially glitch-free operation with improved or maximized output power.

Here, it should be appreciated that FIG. 2 illustrates a specific implementation of the system 100 from FIG. 1, but example embodiments are not limited thereto and may be applied to any suitable system that exchanges optical signals between two endpoints over a waveguide that induces polarization changes to signals passing therethrough.

Figure 3:
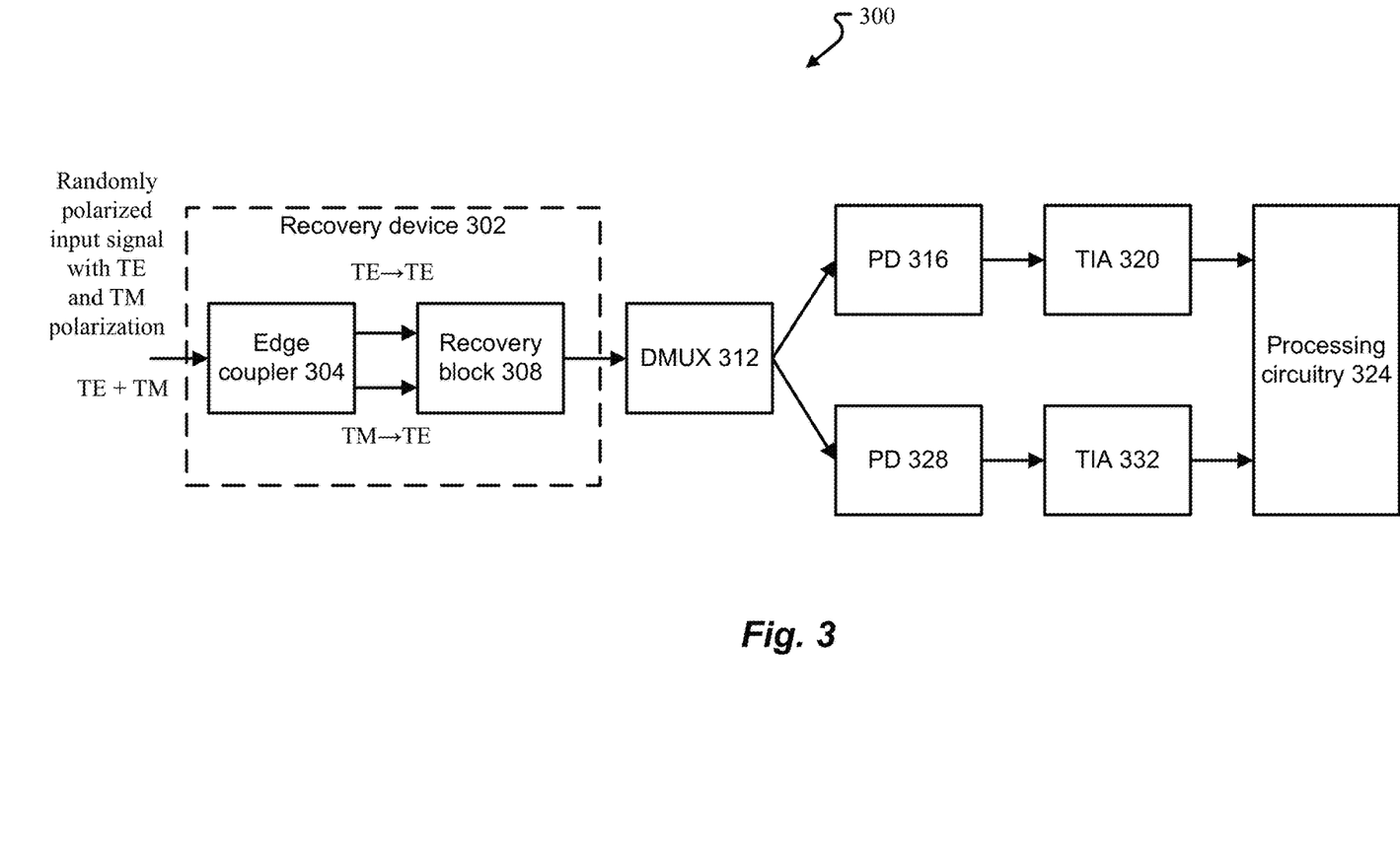
FIG. 3 illustrates a receiver for polarization recovery according to at least one example embodiment.

FIG. 3 illustrates a receiver 300 for polarization tracking and/or recovery according to at least one example embodiment. The receiver 300 may be included in one or more of the chiplets on MCM 204 and/or MCM 212.

As shown, the receiver 300 may include a recovery device 302 with an edge coupler and a recovery block 308, a demultiplexer 312, photodetectors (PD) 316/328, transimpedance amplifiers (TIAs) 320/332, and processing circuitry 324.

As shown, the edge coupler 304 may include a polarization rotator-splitter (PRS) that splits a randomly polarized input optical signal with two polarizations (e.g., transverse electric (TE) and transverse magnetic (TM) polarization) into two signals having same polarization (e.g., TE polarization). Thus, the edge coupler 304 may include a waveguide structure that splits the input signal into a first TE component and a TM component. The edge coupler 304 further includes a waveguide structure that rotates polarization of the TM component to form a second TE component. Both the first and second TE components are then output to the recovery block 308. FIG. 3 illustrates the first TE component as the top output from edge coupler 304 and the second TE component as the bottom output from edge coupler 304. Example embodiments are shown and described with respect to TE and TM polarization states, however, example embodiments are not limited thereto and may apply to other polarization states (e.g., right circular polarization, left circular polarization, linear +45 degrees polarization, linear −45 degrees polarization, and/or the like).

As discussed in more detail below with reference to FIGS. 4-7, the recovery block 308 tracks and recovers polarization of the input signal as originally transmitted to receiver 300. The recovery block 308 is able to do so while also outputting a signal to the DMUX 312 at or near the same signal power of the input signal input to the edge coupler 304 and while providing substantially glitch-free reset operations for phase shifters within the recovery block 308.

In general, the edge coupler 304 and/or some or all components of the recovery block 308 are implemented with silicon photonics (SiP) where silicon or silicon based material is used as the optical medium for optical components of the edge coupler 304 and/or the recovery block 308. Additional components of the receiver 300 may also be implemented with silicon photonics.

The DMUX 312 may receive and demultiplex the signal output from the recovery block 308 before passing demultiplexed signals to two or more branches of receiver circuitry. In this case, each branch of receiver circuitry comprises a photodetector and a transimpedance amplifier. FIG. 3 illustrates two such branches with photodetectors 316 and 328 and TIAs 320 and 332 (only two branches shown but more or fewer may be included depending on a number of wavelengths included in the input signal). Signals output from the TIA 320 and 332 are passed to processing circuitry 324 which recovers data modulated on the input signal received at the edge coupler 304 according to any suitable technique. The processing circuitry 324 may include the same or similar processing circuitry as that described above with reference to FIG. 1.

Here, it should be appreciated that the DMUX 312 is an optional component of the system 300, for example, when the input signal has single wavelength. In other words, the DMUX 312 is useful for demultiplexing a WDM signal that has multiple wavelengths. However, example embodiments also apply systems that do not implement WDM. In this case, the system may include only one branch of receiver circuitry with one photodetector and TIA coupled to the output of the recovery block 308.

Figure 4:
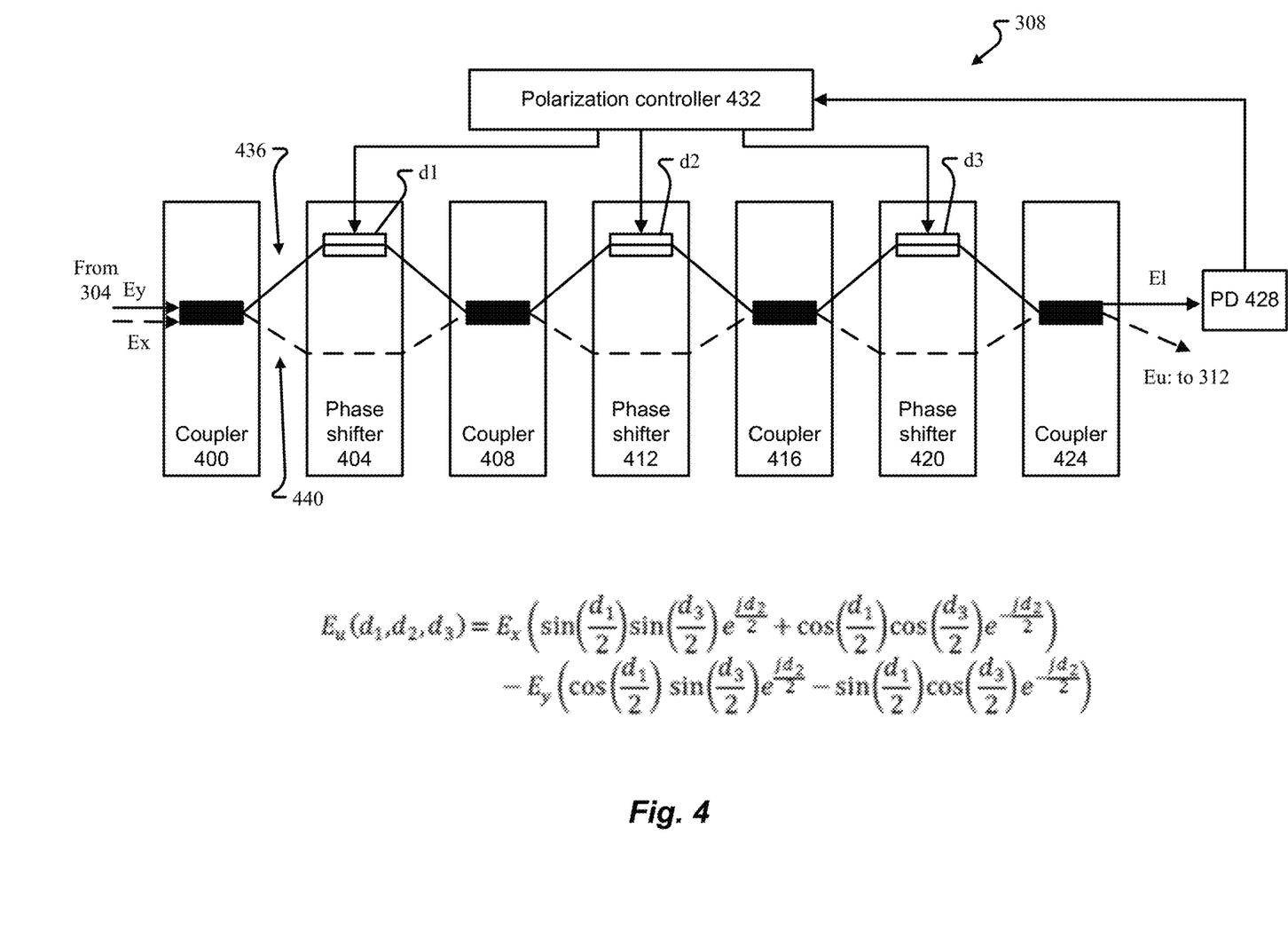
FIG. 4 illustrates the recovery device from FIG. 3 in more detail according to at least one example embodiment.

FIG. 4 illustrates the recovery device from FIG. 3 in more detail according to at least one example embodiment. As shown, the recovery block 308 comprises couplers 400, 408, 416, and 424, phase shifters 404, 412, and 420, a photodetector 428, a polarization controller 432, and waveguide sections 436 and 440.

The couplers 400, 408, 416, and 424 may comprise optocouplers (illustrated with solid black rectangles), for example, 3 dB couplers for coupling two input optical signals to generate corresponding output optical signals. The coupler 400 receives the first and second TE component signals from edge coupler 304 in FIG. 3.

The phase shifters 404, 412, and 420 may comprise thermo-optical phase shifters (or heaters) that change the phase of a signal passing through a waveguide with heat generated by one or more electrodes (illustrated by transparent rectangles) that receive electrical signals from the polarization controller 432. For example, each phase shifter 404, 412, and 420 is controlled to introduce a respective phase shift d1, d2, or d3 on the optical signal passing through waveguide section 436. Although FIG. 4 illustrates that the phase shifters 404, 412, and 440 apply phase shifts to signals passing through waveguide section 436, it should be appreciated that additional electrodes may be placed in the path of waveguide section 440 if desired in order to enable phase adjustment for the signal passing through waveguide section 440.

The photodetector 428 may include a photodiode or other photosensor positioned to detect light output from one of the waveguide sections (e.g., waveguide section 436).

The polarization controller 432 may comprise the same or similar processing circuitry as that described above with reference to FIG. 1. In general, the polarization controller 432 receives feedback from the photodetector 428 and generates control signals (e.g., voltage signals) that are applied to one or more of the phase shifters 404, 412, and 420 based on the feedback. As discussed in more detail below, the polarization controller 432 may also provide glitch-free reset operations that involve resetting one or more of the phase shifters 404, 412, and 420.

In general, reset operations are used for polarization recovery devices because the thermo-optical phase shifters operate within limited phase (voltage) ranges. For example, a reset operation for a phase shifter may be performed when the phase shifter is operating or about to operate near, at, and/or over the capability of the phase shifter and/or some other component of the recovery block 308. For example, the polarization controller 432 initiates a reset operation for a phase shifter upon detecting that a next step up or next step down in the voltage being applied to the electrode of a phase shifter will be exceed a maximum or a minimum possible voltage that the electrode can receive to induce a known phase on the signal (where the maximum and minimum possible voltages may be determined based on the thermal limit of the phase shifter and/or limits of the power supply applying the voltage to the electrode of the phase shifter).

Polarization recovery devices with two-degrees of freedom may suffer from glitchy reset operations that occur at unpredictable times and/or that negatively affect a signal parameter being monitored at the output (e.g., signal power, phase, coding (time and/or frequency coding), temperature, etc.), which can interrupt accurate recovery of data within the system 100. Substantially glitch-free reset operations for a phase shifter may be defined as reset operations that occur at predictable intervals or known times and/or that occur without significantly affecting one or more signal parameters at the output of the recovery block 308. As discussed in more detail below, FIG. 4 illustrates an example where the signal parameter under consideration is output power of signal Eu, and thus, a glitch-free reset operation may be defined in FIG. 4 as a reset operation that does not affect output power of signal Eu more than a threshold amount (e.g., a power loss of 1 dB or less). However, example embodiments are not limited thereto and other power loss thresholds and/or signal parameters may be used. In addition, inventive concepts provide a tractable solution that is practical and solvable in polynomial time. The recovery block 308 of FIG. 4 has more than two degrees of freedom that are operated in accordance with the description below which accomplishes glitch-free reset operations.

Here, it should be appreciated that for a recovery block 308 with two degrees of freedom, for example, associated with phase shifters 412 and 420 (and not 404), each degree of freedom may perform a function related to recovering polarization of the signal input to the receiver 300. In FIG. 4, a first degree of freedom is made up of phase shifter 412 while a second degree of freedom is made up of phase shifter 420 and couplers 416 and 424. In general, a polarized optical field of the signal input to the receiver 300 may be expressed as:

$$\vec{E} = \sqrt{P}\begin{bmatrix} \cos(\theta)e^{-j\phi} \\ \sin(\theta) \end{bmatrix},$$

where P relates to signal power, θ relates to power ratio, and where ϕ relates to phase difference.

In operation, phase shifter 412 may assist with removing the relative phase difference between two signals while phase shifter 420 sets the power ratio between two signals. However, a recovery block with only two degrees of freedom may suffer from reset operations that cause the recovery block to temporarily have reduced output power which reduces performance of the system. This temporary change in output power (i.e., a glitch) may be mitigated using forward error correction (FEC) and/or heuristics, however, these methods may not efficiently and/or correctly recover of data from the input signal.

The recovery block 308 in FIG. 4 proposes to address the above problems by including an auxiliary (third) degree of freedom associated with phase shifter 404. The auxiliary degree of freedom may be made up of phase shifter 404 and couplers 400 and 408. In the example of FIG. 4, the phase shifter 404 may be operated to substantially prevent or reduce the loss of output power at the output of the recovery block 308 during a reset operation for phase shifter 412 and/or phase shifter 420, thereby allowing for substantially glitch-free reset operations of the recovery block 308 (e.g., reset operations that do not significantly alter output power of signal Eu of the recovery block 308). As a result of the system being substantially glitch-free, the system may avoid the power and computing resource consumption used for FEC and/or heuristics.

FIG. 4 illustrates an equation used to neutralize the effects of resetting a phase shifter on output power during a reset operation for that phase shifter. Here, it should be appreciated that Ex corresponds to the signal of the bottom TE signal input to the recovery block 308 from FIG. 3 while Ey corresponds to signal of the top TE signal input to the recovery block 308. Meanwhile, El corresponds to the signal output by waveguide section 436 at coupler 424 while Eu corresponds to the signal output by waveguide section 440 at coupler 424. In the example of FIG. 4, d1, d2, and d3 may be phase shift values that range from 0 to 2π.

In general, the recovery block 308 in FIG. 4 functions to maximize power of signal Eu for input into the DMUX 312 and to minimize power of signal El based on feedback provided to the polarization controller 432 by photodetector 428 that detects the light intensity of the signal output from waveguide section 440 (ideally, the power for signal El is as close to zero as possible). The recovery block 308 also provides substantially glitch-free reset operations for phase shifters 412 and/or 420, which may include the polarization controller 432 determining that a reset operation should be performed based on one or more factors and selecting a value or values for d1, d2, and/or d3 that reduce or minimize the effect of the reset operation on output power of signal Eu from the equation in FIG. 4. For example, during a reset of phase shifter d2, the polarization controller 432 selects and applies values for d1 and d3 that reduce or substantially eliminate the Ey term in the equation of FIG. 4. As a result, the power for signal Eu of the signal output at coupler 424 is increased or maximized (e.g., as close to the input power for signal Ex as possible).

In addition, the recovery block 308 of FIG. 4 establishes an endless tracking range based on the following equations which hold true at selected range limits for phase values d2 and d3:

$$d_3 \in [k\pi, (k+1)\pi], d_2 \in [m\pi, (m+2)\pi]; m, k = \pm \quad (1)$$
$$1, \pm 2, \pm 3, \ldots \ P_u(d_1, d_2 + x, \pi k) = P_u(d_1, d_2, \pi k)$$

$$\frac{\partial P_u(d_1, d_2, d_3)}{\partial d_3} = -\frac{\partial P_u(d_1, d_2 \pm \pi, d_3)}{\partial d_3} \quad (2)$$

$$P_u(d_1 + x, m\pi, d_3 + x) = P_u(d_1, m\pi, d_3); m \text{ even} \quad (3)$$

In the above equations (or invariance conditions), Pu corresponds to output power of signal Eu in FIG. 4, m and k are integer constants that determine the range limits for phase values d2 and d3, and x denotes a change in the relevant degree of freedom. As may be appreciated from equation 3, for example, adjusting d1 and d3 by the same amount has little to no effect on output power Pu.

Figure 5A:
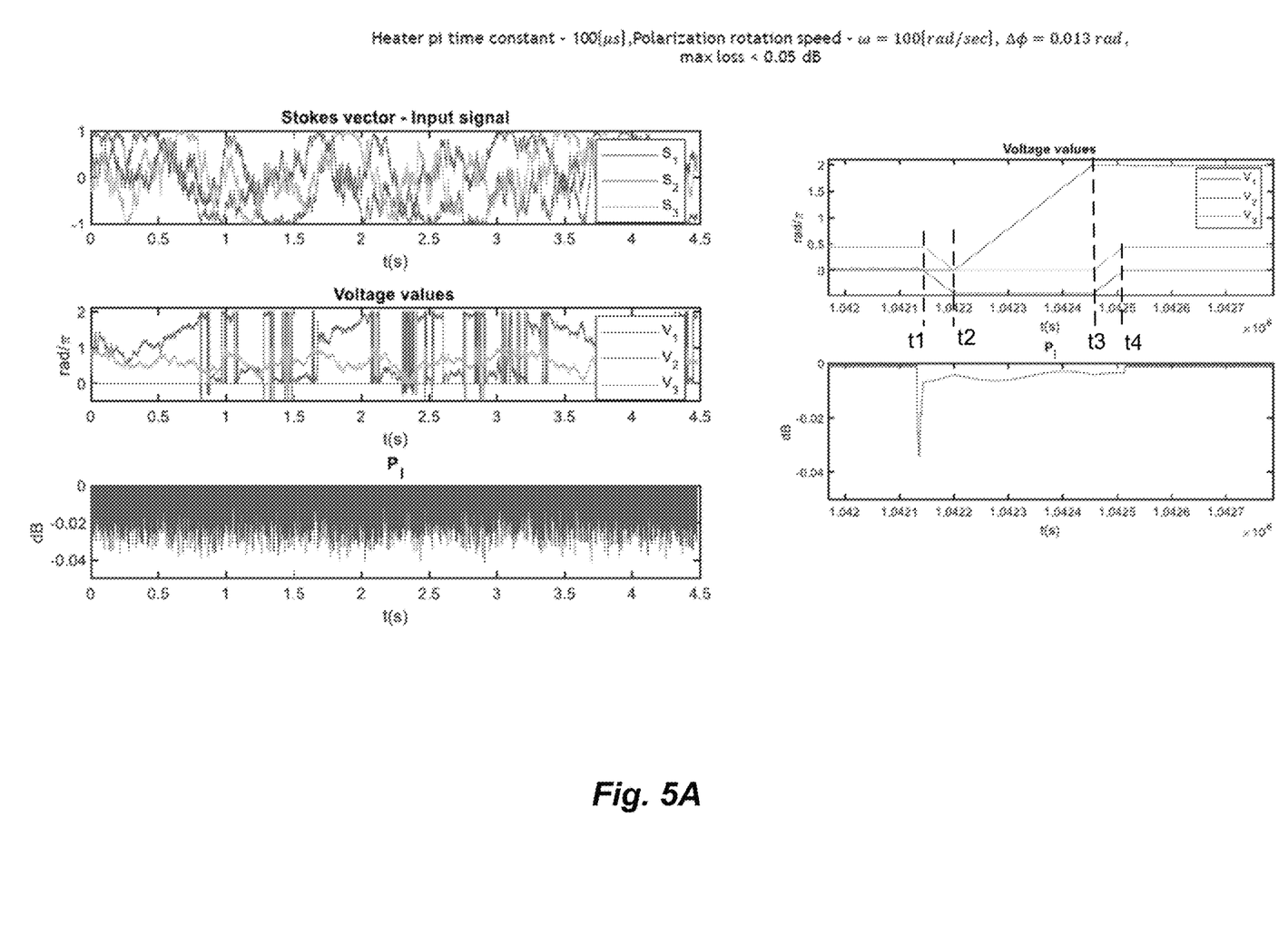
FIGS. 5A and 5B illustrates graphics for explaining substantially glitch-free reset operations for phase shifters in FIG. 4 according to at least one example embodiment.
Figure 5B:
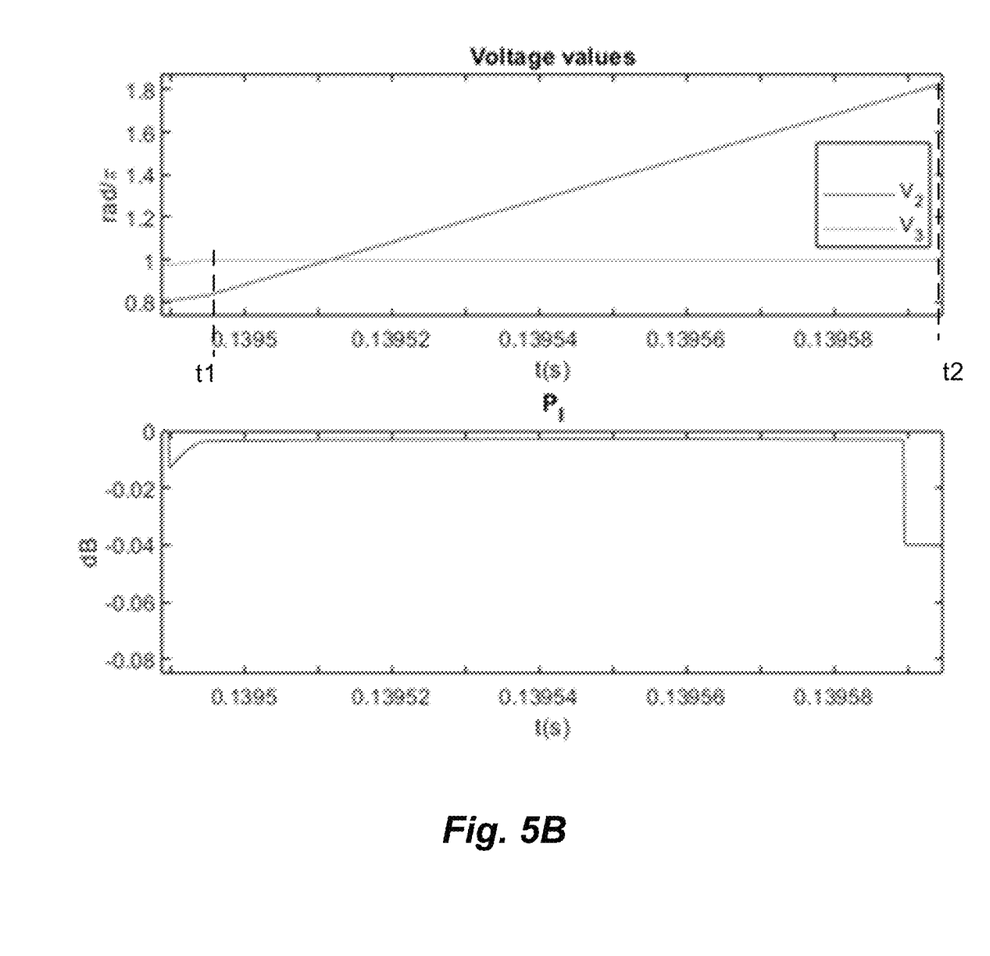
Figure 6:
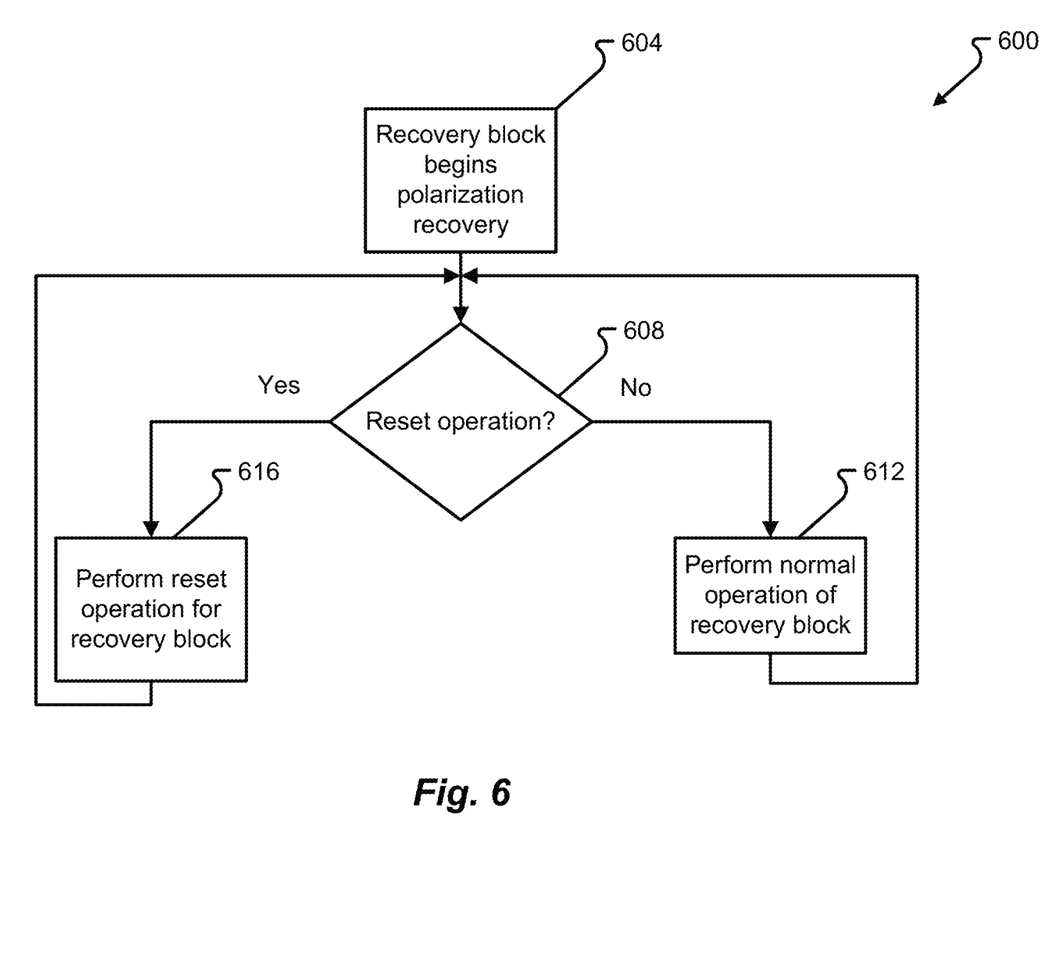
FIG. 6 illustrates a method according to at least one example embodiment.
Figure 7:
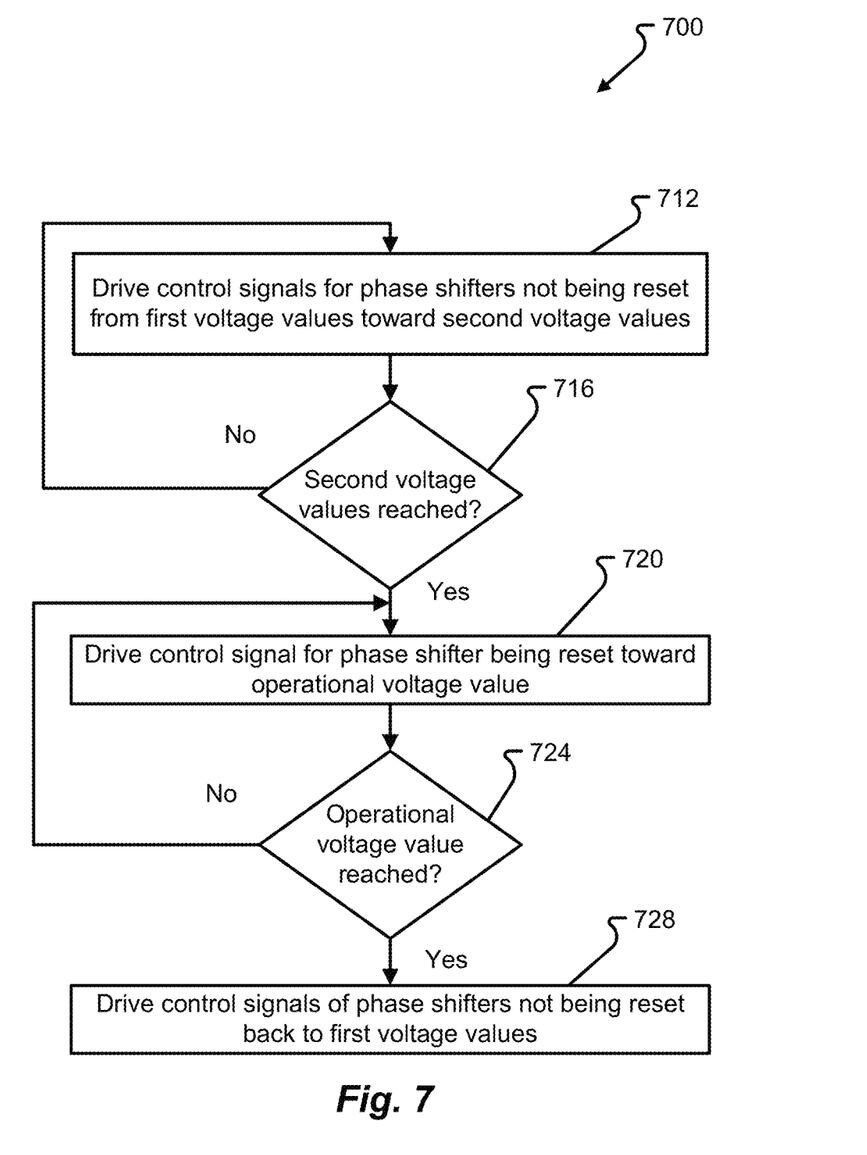
FIG. 7 illustrates a method according to at least one example embodiment.

FIGS. 5-7 are discussed in more detail below with reference to glitch-free reset operations that increase or maximize output power of signal Eu, as in FIG. 4. However, example embodiments are not limited thereto and glitch-free reset operations may be carried out for any suitable signal parameter output from recovery block 308.

FIG. 5A illustrates graphics for explaining a substantially glitch-free reset operation for phase shifter 412 in FIG. 4, where the recovery block 308 of FIG. 4 operates with the parameters illustrated in FIG. 5A with a maximum output power loss P1 of less than 0.05 dB. In the example of FIG. 5A, the output power of signal Eu output from the recovery block 308 stays substantially the same during a glitch-free reset operation but phase of the signal Eu may vary.

V1, V2, V3 in the graph on the right side of the figure correspond to control signals applied to phase shifters 404, 412, and 420 by the polarization controller 432 to cause the phase shifters to introduce corresponding phase changes to a signal. For example, the control signals V1, V2, and V3 are voltage signals applied to phase shifters 404, 412, and 420 (e.g., to electrodes of phase shifters) to introduce phase values d1, d2, and d3, respectively, in the equation of FIG. 4. At time t1 in FIG. 5A, the polarization controller 432 determines that reset operation should be carried out for phase shifter 412 for one of the reasons described herein (e.g., the polarization controller 432 may have determined that a reset operation should be performed because a next adjustment for the recovery block 308 is not within the capability of the recovery block 308 without resetting phase shifter 412). As shown, V2 is initially zero at time t1 but should be raised to a higher value in order to reset the phase shifter 412 and allow the recovery block 308 to return to normal operation.

At time t1, the polarization controller 432 substantially simultaneously drops V1 and V3. For example, V1 applied to phase shifter 404 and V3 applied to phase shifter 420 are controlled to drop by substantially the same amount. Thereafter, between times t2 and t3, control signals V1 and V3 applied to phase shifters 404 and 420 are held constant until control signal V2 for the phase shifter 412 reaches an operational value at time t3. When control signal V2 applied to phase shifter 412 reaches the desired value at time t3, control signals V1 and V3 applied to phase shifters 404 and 420 are substantially simultaneously driven up by substantially the same amount as one another and the recovery block 308 assumes normal operation after time t4. As shown, control signals V1 and V3 may be driven up between times t3 and t4 by the same amount as the control signals V1 and V3 were driven down between times t1 and t2.

The times at which control signals V1 and V3 are simultaneously applied to phase shifters 404 and 420 (i.e., times t1 and t3) in relation to the timing of control signal V2 for phase shifter 412 may be a design parameter set based on empirical evidence and/or preference. In addition, the values for control signals V1, V2, and V3 over time may vary according to how each control signal affects phase values d1, d2, and/or d3 in the equation of FIG. 4.

FIG. 5B illustrates graphics for explaining a substantially glitch-free reset operation for phase shifter 420 in FIG. 4. At time t1 in FIG. 5B, the polarization controller 432 has determined that a reset operation should be performed for phase shifter 420 for one of the reasons described herein and begins raising control signal V2 (the lower line at time t1) from a first voltage value to a second voltage value. At time t2, control signal V2 has reached the second voltage value and the recovery block 308 returns to normal operation. As shown, the maximum power loss P1 for signal Eu at the output of the recovery block 308 is less than 0.05 dB. Notably, a reset operation for phase shifter 420 that is receiving control signal V3 does not necessarily require shifting the value of V3. Instead, the reset operation for phase shifter 420 can be considered a one-step operation that changes the value of control signal V2. Values of the control signals V2 and V3 during a reset for phase shifter 420 may vary according to design preferences. In addition, resetting phase shifter 420 does not require involvement of phase shifter 404, and thus control signal V1 is not shown in FIG. 5B. One may further appreciate that phase shifter 404 does not necessarily undergo reset operations since phase shifter 404 is used to compensate for resets that occur for phase shifter 412 and/or phase shifter 420. Indeed, phase shifter 404 may be inactive during normal operation of the recovery block 308 where phase shifters 412 and 420 operate to recover polarization of an input signal and/or to maximize output power, and thus, is not likely to require a reset operation.

FIG. 6 illustrates a method 600 according to at least one example embodiment. The method 600 may be performed by the recovery block 308 in FIG. 4 of the recovery device 302 to achieve glitch-free reset operations.

Operation 604 includes initiating polarization recovery for the recovery block 308 in FIG. 4. For example, the polarization controller 432 applies initial control signals to phase shifters 412 and 420 to eliminate the relative phase difference between the two TE signals introduced to respective waveguide sections 236 and 240 and to maximize output power of the signal Eu.

Operation 608 includes determining whether a reset operation should be performed. For example, the polarization controller 432 determines whether a reset operation should be performed for phase shifter 412 and/or phase shifter 420. If not, the method proceeds to operation 612. If so, the method proceeds to operation 616.

In one embodiment, determining whether the reset operation should be performed includes monitoring one or more factors associated with the phase shifter 412 and/or the phase shifter 420. The one or more factors may include factors associated with temperature, time, value of a phase shift being introduced by a phase shifter, a control signal being applied to the electrode(s) of a phase shifter to cause the phase shift, and/or the like. For example, the polarization controller 432 may monitor the temperature of the phase shifters 412 and 420 using one or more temperature sensors and determine to reset a phase shifter when a sensed temperature of that phase shifter is greater than a threshold temperature. In another example, the polarization controller 432 may track an amount of time since the previous reset operation for a phase shifter (or an amount of time since the initiation of operation 504) and determine that a next reset operation for that phase shifter should be performed when the amount of time is greater than a threshold amount of time. In yet another example, the polarization controller 432 may track the phase value d2 and/or d3 and determine that the phase shifter should be reset when a value of d2 and/or d3 approaches the limit(s) set for d2 and/or d3. Still further, the polarization controller 432 may track the control signals V2 and/or V3 and determine that a phase shifter should be reset when a value of V2 and/or V3 exceeds a maximum and/or minimum voltage threshold. Here, it should be appreciated that the threshold temperature, the threshold amount of time, the phase value limits, and/or threshold voltage values may be design parameters set based on empirical evidence (e.g., historical data) and/or preference. In addition, any suitable combination of the above factors may be used to determine when to perform a reset operation. In at least one embodiment, the polarization controller 432 updates one or more reset flags after each reset operation and employs hysteresis to avoid infinite concurrent resets that may occur due to noise (e.g., noisy feedback measurements) and/or other anomaly within the system. In this case, the polarization controller 432 may employ hysteresis to avoid performing multiple resets caused by the noise or other anomaly.

Operation 612 includes performing normal operation of the recovery block 308 when the determination is operation 608 is 'no.' For example, operation 612 may include the polarization controller 432 monitoring feedback of the recovery block 308 through photodetector 428 and generating control signals for electrodes of the phase shifters 412 and/or 420 that remove (or reduce) the relative phase difference between signals input to phase shifter 412 and/or that maximize (or increase) output power of signal Eu at the output of the recovery block 308. In one embodiment, the polarization controller 432 implements a gradient descent algorithm to minimize the power of signal El at the output of the recovery block 308. However, example embodiments are not limited thereto, and other suitable algorithms may be used for the same or similar purpose (e.g., a gradient ascent algorithm may be used if the photodetector 428 senses at least part of the signal output from waveguide section 440 instead of from waveguide section 436).

Operation 616 includes performing a reset operation for the recovery block 308 when the determination in operation 608 is 'yes.' For example, the polarization controller 432 generates and applies control signals to phase shifters 404, 412, and 420 in a manner that increases or maximizes power of signal Eu using the equation from FIG. 4 (see, for example, FIG. 5 showing a reset operation for phase shifter 412). Additional details of the reset operation are described below with reference to FIG. 7.

FIG. 7 illustrates a method 700 according to at least one example embodiment. The method 700 illustrates additional details for operation 616 in FIG. 6 which relates to performing a reset operation for a phase shifter. In other words, the method 700 may be performed when the determination in operation 608 is 'yes' for any of the reasons discussed above. For the sake of explanation, FIG. 7 is discussed with respect to the timing diagrams shown in FIG. 5 where the polarization controller 432 may have determined to perform a reset operation because V2 exceeded or is about to exceed a minimum threshold value.

Operation 712 includes driving control signals for phase shifters not being reset from respective first voltage values toward second voltage values. For example, as shown in FIG. 5A, the polarization controller 432 begins lowering V1 and V3 at time t1 from respective first voltage values toward respective second voltage values while V2 remains constant at zero.

Operation 716 includes determining whether the second voltage values have been reached. If so, the method proceeds to operation 720. If not, the method proceeds back to operation 712. In FIG. 5A, the polarization controller 432 determines that V1 and V3 reach respective second voltage values at time t2. In at least one embodiment, the second voltage value for each phase shifter not being reset may have substantially the same difference between that second voltage value and a respective first voltage value for a phase shifter. In FIG. 5A, for example, each of V1 applied to phase shifter 404 and V3 applied to phase shifter 420 drops by substantially the same amount. In any event, the difference between the first voltage value and the second voltage value for each phase shifter not being reset may be a design parameter set based on empirical evidence and/or preference. For example, the difference between the first voltage value and the second voltage value may be based on the below discussed operational voltage value for the phase shifter being reset. In at least one embodiment, the polarization controller 432 contains and/or consults a lookup table (LUT) or other suitable data structure that includes information useful for determining when to adjust and/or how much to adjust V1, V2, and/or V3 during a reset operation. For example, an LUT may include application timing and voltage values for control signals V1, V2, and V3 that should be used for a reset operation of phase shifter 412 and for a reset operation of phase shifter 420. Such an LUT may be generated in one or more calibration operations designed to find optimum application timing and values for V1, V2, and V3 under various operating conditions of the recovery block 308. In addition, it should be appreciated that although FIG. 5A illustrates V1 and V3 for phase shifters 404 and 420 dropping, example embodiments are not limited thereto, and V1 and V3 may rise depending on the design.

Upon determining that respective second voltage values have been reached in operation 716, the method proceeds to operation 720 which includes driving the control signal applied to the phase shifter being reset toward an operational voltage value. For example, in FIG. 5A, V2 for the phase shifter 412 is driven toward the operational voltage value starting at time t2. The operational voltage value may be determined by the polarization controller 432 as the voltage value to be met in order to return the recovery block 308 back to normal operation as in operation 612 to recover polarization of the input signal and/or to maximize output power of signal Eu.

Operation 724 includes determining whether the operational voltage value for the phase shifter being reset has been reached. If not, the method returns to operation 720. If so, the method proceeds to operation 728. As shown in FIG. 5A, V2 for phase shifter 412 reaches the operational voltage value 2 rad/π at time t3.

Operation 728 includes driving control signals applied to phase shifters not being reset back to their respective first voltage values. As shown in FIG. 5A, V1 and V3 are returned to their initial respective values at time t4 and remain at the first voltage values for normal operation as in operation 616.

As shown in the example of FIG. 5A, the maximum output power loss P1 for signal Eu in FIG. 4 occurs at or near time t1 and is less than 0.04 dB and the duration of maximum output power loss P1 is short, which means that data can be recovered from the signal output from waveguide section 440 without using FEC and/or other similar techniques.

In view of FIGS. 1-7, at least one example embodiment is directed to a polarization recovery device 302 including an input that receives a first optical signal with unknown polarization and with at least one signal parameter (e.g., signal power, phase, and/or the like) at an initial value. The polarization recovery device 302 includes a first output that outputs a second optical signal with known polarization and with the at least one signal parameter at or near the initial value. The polarization recovery device 302 includes a recovery block 308 that generates the second optical signal based on the first optical signal.

The polarization recovery device 302 includes a splitter (e.g., edge coupler 304) coupled to the input and that splits the first optical signal to output a first signal component of the first optical signal and a second signal component of the first optical signal. The splitter causes first signal component and the second signal component to have a substantially same polarization. In at least one embodiment, the substantially same polarization corresponds to transverse electric (TE) polarization or transverse magnetic (TM) polarization.

The recovery block 308 includes a first waveguide section 440 that forms a first optical path for the first signal component and a second waveguide section 436 that forms a second optical path for the second signal component. The recovery block 308 includes a set of phase shifters coupled to the second waveguide section 436 at first points within the recovery block 308. The polarization recovery device 302 includes a set of optocouplers coupled to the first waveguide section 440 and the second waveguide section 436 at second points within the recovery block 308. The set of phase shifters may include three phase shifters (e.g., 404, 408, 412), and the set of optocouplers may include three optocouplers (e.g., 408, 416, 424). As shown in FIG. 4, each second point is located after a respective first point along the second optical path.

The polarization recovery device 308 includes a second output that outputs a third optical signal and a feedback device coupled to the second output. The recovery block 308 uses feedback from the feedback device to generate the second optical signal while providing substantially glitch-free reset operations for one or more phase shifters (e.g., 412 and 416) of the recovery block. The feedback device may include a detector (e.g., 428) that detects the third optical signal. A controller 432 generates electrical signals for electrodes of the three phase shifters based on output of the detector.

At least one example embodiment is directed to a receiver 300 including the polarization recovery device 308. The receiver 300 may further include a demodulator (e.g., DMUX 312) that demodulates the second optical signal to form a plurality of optical signals with different wavelengths, a plurality of detector blocks coupled to the demodulator. Each detector block may include a PD and a TIA (e.g., PD 316 and TIA 320) and detect a respective optical signal in the plurality of optical signals. The receiver 300 may further include processing circuitry 324 that extracts data from the plurality of optical signals based on output of the plurality of detector blocks. The processing circuitry 324 may extract the data in any suitable manner (e.g., by decoding the optical signals).

At least one example embodiment is directed to a method that includes determining to perform a reset operation for a first phase shifter (e.g., phase shifter 412) of a polarization recovery device 302 based on one or more factors associated with the first phase shifter. The method includes generating (by the controller 432) at least one control signal to be applied to at least one additional phase shifter (e.g., 404) of the polarization recovery device during the reset operation to keep at least one parameter of a signal output from the recovery device within acceptable limits. Signal power is an example of at least one parameter that may be kept within acceptable limits (e.g., within a certain amount of power loss). The method includes outputting the at least one control signal to the at least one additional phase shifter. The at least one additional phase shifter includes a second phase shifter (e.g., 404) and a third phase shifter (e.g., 420). In one embodiment, the at least one control signal includes a first control signal applied to the second phase shifter during the reset operation and a second control signal applied to the third phase shifter during the reset operation. As shown in FIG. 5, for example, the first control signal and the second control signal rise and fall together (e.g., at a substantially same time) during the reset operation.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) A polarization recovery device, comprising:
an input that receives a first optical signal with unknown polarization and with at least one signal parameter at an initial value;
a first output that outputs a second optical signal with known polarization and with the at least one signal parameter at or near the initial value; and
a recovery block that generates the second optical signal based on the first optical signal.

(2) The polarization recovery device of (1), further comprising:
a splitter coupled to the input and that splits the first optical signal to output a first signal component of the first optical signal and a second signal component of the first optical signal.

(3) The polarization recovery device of one or more of (1) to (2), wherein the splitter causes first signal component and the second signal component to have a substantially same polarization.

(4) The polarization recovery device of one or more of (1) to (3), wherein the substantially same polarization corresponds to transverse electric (TE) polarization or transverse magnetic (TM) polarization.

(5) The polarization recovery device of one or more of (1) to (4), wherein the recovery block includes:
a first waveguide section that forms a first optical path for the first signal component; and
a second waveguide section that forms a second optical path for the second signal component.

(6) The polarization recovery device of one or more of (1) to (5), wherein the recovery block includes a set of phase shifters coupled to the second waveguide section at first points within the recovery block.

(7) The polarization recovery device of one or more of (1) to (6), further comprising:
a set of optocouplers coupled to the first waveguide section and the second waveguide section at second points within the recovery block.

(8) The polarization recovery device of one or more of (1) to (7), wherein the set of phase shifters includes three phase shifters, and wherein the set of optocouplers includes three optocouplers.

(9) The polarization recovery device of one or more of (1) to (8), wherein each second point is located after a respective first point along the second optical path.

(10) The polarization recovery device of one or more of (1) to (9), further comprising:
 a second output that outputs a third optical signal; and
 a feedback device coupled to the second output.

(11) The polarization recovery device of one or more of (1) to (10), wherein the recovery block uses feedback from the feedback device to generate the second optical signal while providing substantially glitch-free reset operations for one or more phase shifters of the recovery block.

(12) A receiver, comprising:
 a polarization recovery device including:
  an input that receives a first optical signal with unknown polarization and with at least one signal parameter at an initial value;
  a first output that outputs a second optical signal with known polarization and with the at least one signal parameter at or near the initial value; and
  a recovery block that generates the second optical signal based on the first optical signal.

(13) The receiver of (12), wherein the recovery block includes:
 a first waveguide section that forms a first optical path within the recovery block; and
 a second waveguide section coupled to the first output and that forms a second optical path within the recovery block.

(14) The receiver of one or more of (12) to (13), wherein the polarization recovery device includes:
 a splitter coupled between the input and the first and second waveguide sections.

(15) The receiver of one or more of (12) to (14), wherein the recovery block includes:
 a second output coupled to the second waveguide section and that outputs a third optical signal; and
 a feedback device coupled to the second output, wherein the recovery block uses feedback from the feedback device to generate the second optical signal.

(16) The receiver of one or more of (12) to (15), wherein the recovery block includes:
 three phase shifters coupled to the second waveguide section at first points within the recovery block; and
 three optocouplers coupled to the first waveguide section and the second waveguide section at second points within the recovery block, wherein each second point is located after a respective first point along the second optical path.

(17) The receiver of one or more of (12) to (16), wherein the feedback device includes:
 a detector that detects the third optical signal; and
 a controller that generates electrical signals for electrodes of the three phase shifters based on output of the detector.

(18) The receiver of one or more of (12) to (17), further comprising:
 a demodulator that demodulates the second optical signal to form a plurality of optical signals with different wavelengths;
 a plurality of detector blocks coupled to the demodulator, each detector block detecting a respective optical signal in the plurality of optical signals; and
 processing circuitry that extracts data from the plurality of optical signals based on output of the plurality of detector blocks.

(19) A method, comprising:
 determining to perform a reset operation for a first phase shifter of a polarization recovery device based on one or more factors associated with the first phase shifter;
 generating at least one control signal to be applied to at least one additional phase shifter of the polarization recovery device during the reset operation to keep at least one parameter of a signal output from the recovery device within acceptable limits; and
 outputting the at least one control signal to the at least one additional phase shifter.

(20) The method of (19) wherein the at least one additional phase shifter includes a second phase shifter and a third phase shifter, wherein the at least one control signal includes a first control signal applied to the second phase shifter during the reset operation and a second control signal applied to the third phase shifter during the reset operation, and wherein first control signal and the second control signal rise and fall together during the reset operation.

What is claimed is:
1. A polarization recovery device, comprising:
 an input that receives a first optical signal with unknown polarization and with at least one signal parameter at an initial value;
 a first output that outputs a second optical signal with known polarization and with the at least one signal parameter at a maximum possible value at a particular instance in time;
 a recovery block that generates the second optical signal based on the first optical signal; and
 a splitter coupled to the input and that splits the first optical signal to output a first signal component of the first optical signal and a second signal component of the first optical signal, wherein the recovery block includes:
  a set of phase shifters including a first phase shifter that is closest to an output of the splitter compared to other phase shifters in the set of phase shifters; and
  a set of optocouplers including a first optocoupler coupled between the output of the splitter and the first phase shifter.

2. The polarization recovery device of claim 1, wherein the splitter causes the first signal component and the second signal component to have a substantially same polarization.

3. The polarization recovery device of claim 2, wherein the substantially same polarization corresponds to transverse electric (TE) polarization or transverse magnetic (TM) polarization.

4. The polarization recovery device of claim 1, wherein the recovery block includes:
 a first waveguide section that forms a first optical path for the first signal component; and
 a second waveguide section that forms a second optical path for the second signal component.

5. The polarization recovery device of claim 4, wherein the set of phase shifters further include second and third phase shifters coupled to the second waveguide section at first points within the recovery block.

6. The polarization recovery device of claim 5, wherein the set of optocouplers further includes second and third optocouplers coupled to the first waveguide section and the second waveguide section at second points within the recovery block.

7. The polarization recovery device of claim 6, wherein the set of phase shifters includes only the first, second, and third phase shifters, and wherein the set of optocouplers includes only the first, second, and third optocouplers.

8. The polarization recovery device of claim 6, wherein each second point is located after a respective first point along the second optical path.

9. The polarization recovery device of claim 1, further comprising:
a second output that outputs a third optical signal; and
a feedback device coupled to the second output.

10. The polarization recovery device of claim 9, wherein the recovery block uses feedback from the feedback device to generate the second optical signal while providing substantially glitch-free reset operations for one or more phase shifters of the set of phase shifters.

11. The polarization recovery device of claim 1, further comprising:
a controller that:
determines to perform a reset operation for a second phase shifter of the set of phase shifters based on one or more factors associated with the second phase shifter;
generates at least one control signal to be applied to at least the first phase shifter during the reset operation to keep the at least one signal parameter of the second optical signal within acceptable limits; and
output the at least one control signal to at least the first phase shifter.

12. The polarization recovery device of claim 11, wherein the set of phase shifters includes a third phase shifter, wherein the at least one control signal includes a first control signal that the controller applies to the first phase shifter during the reset operation and a second control signal applied to the third phase shifter during the reset operation, and wherein the controller generates the first control signal and the second control signal to rise and fall together during the reset operation.

13. A receiver, comprising:
a polarization recovery device including:
an input that receives a first optical signal with unknown polarization and with at least one signal parameter at an initial value;
a first output that outputs a second optical signal with known polarization and with the at least one signal parameter at a maximum possible value at a particular instance in time;
a recovery block that generates the second optical signal based on the first optical signal; and
a splitter coupled to the input and that splits the first optical signal to output a first signal component of the first optical signal and a second signal component of the first optical signal, wherein the recovery block includes:
a set of phase shifters including a first phase shifter that is closest to an output of the splitter compared to other phase shifters in the set of phase shifters; and
a set of optocouplers including a first optocoupler coupled between the output of the splitter and the first phase shifter.

14. The receiver of claim 13, wherein the recovery block includes:
a first waveguide section that forms a first optical path within the recovery block; and
a second waveguide section coupled to the first output and that forms a second optical path within the recovery block.

15. The receiver of claim 14, wherein the recovery block includes:
a second output coupled to the second waveguide section and that outputs a third optical signal; and
a feedback device coupled to the second output, wherein the recovery block uses feedback from the feedback device to generate the second optical signal.

16. The receiver of claim 15, wherein the recovery block further includes:
second and third phase shifters coupled to the second waveguide section at first points within the recovery block; and
second and third optocouplers coupled to the first waveguide section and the second waveguide section at second points within the recovery block, wherein each second point is located after a respective first point along the second optical path.

17. The receiver of claim 16, wherein the feedback device includes:
a detector that detects the third optical signal; and
a controller that generates electrical signals for electrodes of the first, second, and third phase shifters based on output of the detector.

18. The receiver of claim 13, further comprising:
a demultiplexer that demultiplexes the second optical signal to form a plurality of optical signals with different wavelengths;
a plurality of detector blocks coupled to the demultiplexer, each detector block detecting a respective optical signal in the plurality of optical signals; and
processing circuitry that extracts data from the plurality of optical signals based on output of the plurality of detector blocks.

19. A system, comprising:
a transmitter that transmits a first optical signal;
an optical transmission line that carries the first optical signal; and
a receiver, comprising:
a polarization recovery device including:
an input coupled to the optical transmission line and that receives the first optical signal with unknown polarization and with at least one signal parameter at an initial value;
a first output that outputs a second optical signal with known polarization and with the at least one signal parameter at a maximum possible value at a particular instance in time;
a recovery block that generates the second optical signal based on the first optical signal; and
a splitter coupled to the input and that splits the first optical signal to output a first signal component of the first optical signal and a second signal component of the first optical signal, wherein the recovery block includes:
a set of phase shifters including a first phase shifter that is closest to an output of the splitter compared to other phase shifters in the set of phase shifters; and
a set of optocouplers including a first optocoupler coupled between the output of the splitter and the first phase shifter.

20. The system of claim 19, further comprising:
a controller that generates control signals for the set of phase shifters based on feedback of the recovery block.

* * * * *